Dec. 2, 1924.
L. T. HARRIGAN
1,517,361
FOOT CONTROL VALVE FOR HYDRAULIC GOVERNORS
Filed Nov. 9, 1923
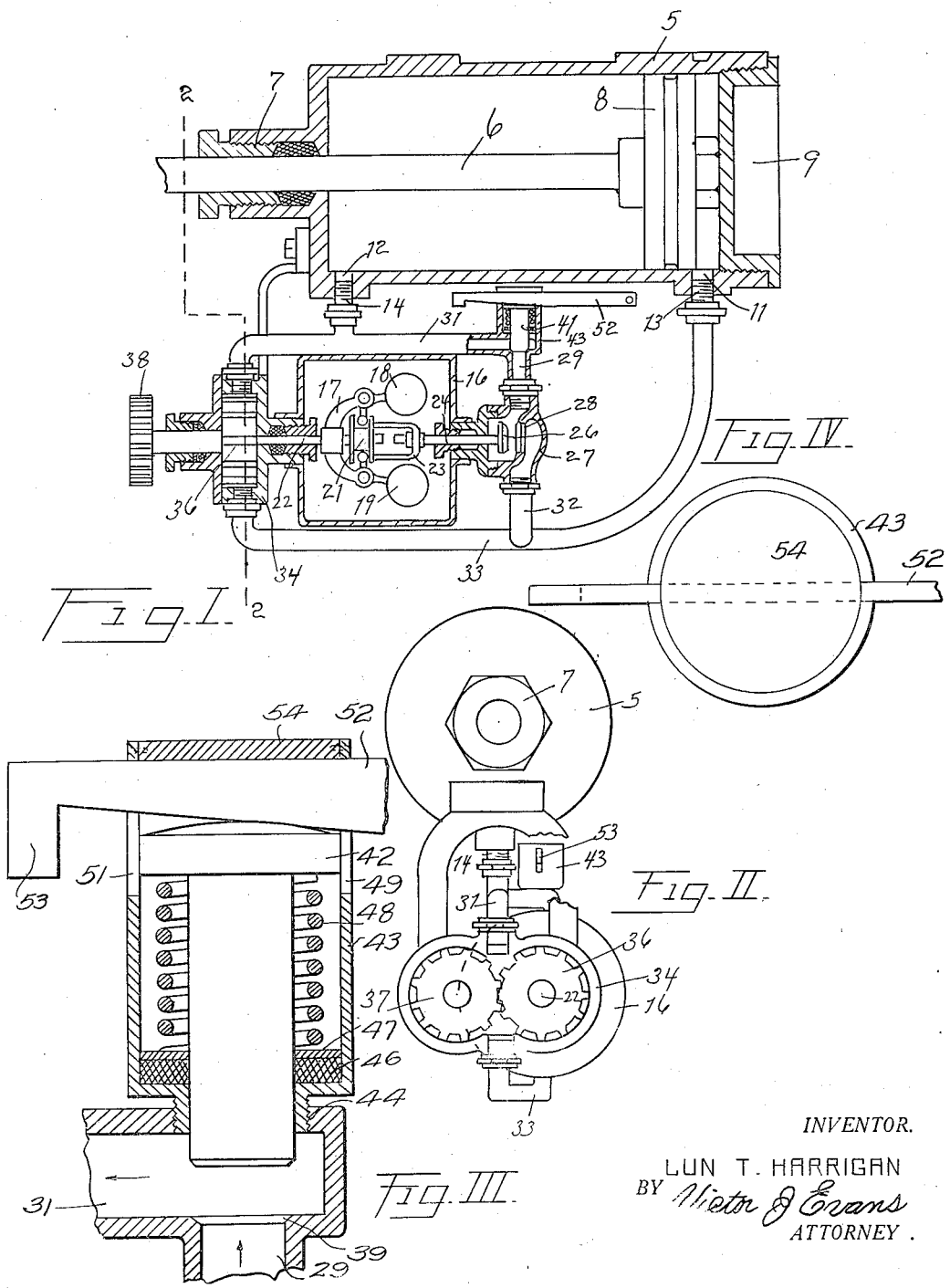
INVENTOR.
LUN T. HARRIGAN
BY Victor J. Evans
ATTORNEY.

Patented Dec. 2, 1924.

1,517,361

UNITED STATES PATENT OFFICE.

LON T. HARRIGAN, OF LOS ANGELES, CALIFORNIA.

FOOT-CONTROL VALVE FOR HYDRAULIC GOVERNORS.

Application filed November 9, 1923. Serial No. 673,861.

*To all whom it may concern:*

Be it known that I, LON T. HARRIGAN, a citizen of the United States, residing at Los Angeles, in the county of Los Angeles and State of California, have invented new and useful Improvements in Foot-Control Valves for Hydraulic Governors, of which the following is a specification.

This invention relates to improvements in foot valves for hydraulic governors.

The principal object of this invention is to provide means whereby the operator of a motor vehicle can operate a foot valve, for the purpose of transferring fluid pressure from the hydraulic governor to the hydraulic braking mechanism.

Another object is to produce a device of this character which is extremely simple and one which may be applied to the standard hydraulic governor now upon the market.

A further object is to provide a device of this character which is simple in construction and one which will not become deranged through ordinary usage.

Other objects and advantages will be apparent during the course of the following description.

In the accompanying drawings forming a part of this specification, and in which like numerals are employed to designate like parts throughout the same, Figure 1 is a vertical cross section of a hydraulic governor and brake cylinder having my valve applied thereto, Figure 2 is a cross section taken on the line 2—2 of Figure 1, Figure 3 is an enlarged detail cross section of my foot valve as applied to the pressure line, and Figure 4 is a top plan view of Figure 3.

Heretofore, as far as applicant is aware of, hydraulic governors merely served to apply brakes when a vehicle traveled at a greater rate of speed upon the pretermined setting of the governor. Applicant has therefore devised a valve which when inserted in the pressure line will transfer the pressure to the braking piston for the purpose of applying the brakes when the speed of the car upon which the same is mounted is less than that for which the governor is set.

In the accompanying drawings wherein for the purpose of illustration is shown a preferred embodiment of my invention, the numeral 5 designates a brake cylinder and the numeral 6 a brake rod passing through a stuffing-box 7 in the end of the cylinder and connected to the piston 8. It is of course understood that this brake rod is connected to the customary brakes of the car.

A head 9 seals the end of the cylinder 5. This cylinder is provided with ports 11 and 12, each of which is screw-threaded to receive a nipple, as shown at 13 and 14. At 16 is shown a housing within which is mounted a governor consisting of a yoke 17 having ball weights 18 and 19 pivoted thereto, which weights are connected through the medium of bell-crank levers, the ends of which are positioned within a collar 21. This collar is slidable upon a drive-shaft 22 and is connected by a yoke 23 to the stem 24 of a valve 26. This valve is positioned within a casting 27 having a seat 28.

One end of this casting is connected by a pipe 29 to a return pipe 31. A pipe 32 is connected to a pressure pipe 33, one end of which is connected to the nipple 13, while the opposite end is connected to a pump housing 34, within which is mounted pump gears 36 and 37 of the usual construction. The pipe 31 is also connected to the top of the pump casing 34 so as to complete a circuit for the pumped fluid. A driving gear 38 is positioned upon the end of the shaft 22.

Referring now to Figure 3, it will be noted that a seat 39 is formed where the pipe 29 joins the pipe 31. This seat is directly below a plunger valve 41, having a head 42 slidable in a casing 43. This casing is screw-threaded as at 44 to the pipe 31 and is provided at its lower portion with a packing 46 having a washer 47 resting thereon. A spring 48 is positioned between the washer and head 42. Slots 49 and 51 are cut in the casing 43 so as to receive a sliding cam 52 provided with a downturned end 53. The upper surface of this cam is adapted to contact a plug 54 pinned to the casing 43. The result of this construction is that when the vehicle is running, fluid will be pumped by the gears 36 and 37 so as to discharge into the pressure pipe 33 and as long as the valve 26 and the valve 41 are in retracted position, the fluid will pass through the pipe 32, casting 27, pipe 29, pipe 31, and back to the other side of the pump. When the governor operates through excessive speed, of rotation caused by the gear 38 being connected to the propeller shaft of the vehicle, the valve 26 will be caused to approach its seat, with the result that as the flow through the casting 27 is cut off, pressure will be created in the pipe 33, which pressure will be transferred to the end of the piston 8 adjacent the head 9, thus forcing the piston rod 6 to the left of the drawing. The fluid which is upon the opposite side of the piston will then discharge through the port 22 into the pipe 31. The description of operation thus far is common.

The change created by my invention consists in forcing the cam 52 to the left of the drawing, which forces the plunger 41 to the position shown in Figure 1, with the result that flow is stopped through the pipe 29 resulting in the pressure again being transferred to the piston 8 as before described. As soon as the cam 52 is retracted the normal circulation will again commence.

It is to be understood that the form of my invention herewith shown and described is to be taken as a preferred example of the same, and that various changes in the shape, size and arrangement of parts may be resorted to without departing from the spirit of the invention or the scope of the subjoined claims.

Having thus described my invention, I claim:—

1. In a device of the character described the combination with a hydraulic braking mechanism, having a fluid circulating system, of a casing secured to one of the pipes of the circulating system, a plunger-valve mounted in said casing and adapted to extend into the circulating system, in such a manner as to be capable of stopping the flow within the system, a spring for retracting said valve, and a manually operated cam for depressing said valve against the action of said spring.

2. In a device of the character described the combination with a hydraulic braking mechanism having a fluid circulating system, of a sliding piston controlled by the fluid pressure in said system, of a valve slidably movable in said system, a spring for normally maintaining said valve, a head formed on said valve, a casing surrounding said head and a major portion of said valve out of the path of the moving fluid, and a manually slidable cam for depressing said valve, substantially as and for the purpose specified.

In testimony whereof I affix my signature.

LON T. HARRIGAN.